(12) United States Patent
Bronicki et al.

(10) Patent No.: US 6,701,712 B2
(45) Date of Patent: Mar. 9, 2004

(54) METHOD OF AND APPARATUS FOR PRODUCING POWER

(75) Inventors: Lucien Y. Bronicki, Yavne (IL); Hilel Legmann, Yavne (IL); Nadav Amir, Rehovot (IL); Dan Batscha, Ramat Hasharon (IL)

(73) Assignee: Ormat Industries Ltd., Yavne (IL)

( * ) Notice: Subject to any disclaimer, the term of this patent is extended or adjusted under 35 U.S.C. 154(b) by 0 days.

(21) Appl. No.: 09/860,516

(22) Filed: May 21, 2001

(65) Prior Publication Data

US 2001/0054288 A1 Dec. 27, 2001

Related U.S. Application Data

(63) Continuation-in-part of application No. 09/577,354, filed on May 24, 2000, now abandoned.

(51) Int. Cl.$^7$ .............................................. F01K 13/00
(52) U.S. Cl. ............................. 60/645; 60/653; 60/670
(58) Field of Search ......................... 60/645, 648, 653, 60/670; 454/245

(56) References Cited

U.S. PATENT DOCUMENTS

| | | | | |
|---|---|---|---|---|
| 4,541,245 A | * | 9/1985 | Becker et al. ................. | 60/648 |
| 4,545,208 A | * | 10/1985 | Kuln .............................. | 60/648 |
| 5,216,884 A | * | 6/1993 | Holsiepe ....................... | 60/648 |
| 5,233,837 A | * | 8/1993 | Callahan ..................... | 60/648 X |

OTHER PUBLICATIONS

"Powerful Returns," International Cement Review, pp. 68–69, Aug. 1999.

"Organic Rankine Cycle Facility at Lengfurt," European Cement Magazine, pp. 50–53, Sep. 1999.

"Investment and Innovation at Heidelberger Zement," World Cement, vol. 30, No. 9, pp. 36–41, 129–132, Sep. 1999.

* cited by examiner

Primary Examiner—Hoang Nguyen
(74) Attorney, Agent, or Firm—Nath & Associates PLLC; Gary M. Nath; Jerald L. Meyer

(57) ABSTRACT

A method and apparatus for producing power comprising a grate cooler for cooling clinker supplied from cement production apparatus, an electrostatic precipitator that extracts particulate matter from hot air supplied from said grate cooler, the grate cooler and electrostatic precipitator working in combination with an air-heat transfer heat-exchanger, a pre-heater, a vaporizer, a turbine, and a working fluid condenser, to produce power.

19 Claims, 9 Drawing Sheets

METHOD OF AND APPARATUS FOR PRODUCING POWER

This application is a continuation-in-part of application Ser. No. 09/577,354, filed May 24, 2000, now abandoned.

DESCRIPTION

1. Technical Field

This invention relates to producing power, and more particularly, to a method of and apparatus for producing power in connection with the production of cement.

2. Background of the Invention

Recently, the need to produce electricity and power from local available heat sources has become of greater interest. In particular, such a heat source exists in cement producing plants. Since the environmental requirements such cement producing plants have to comply with can be quite stringent, the production of electricity and power from cement producing factories needs particular attention.

It is therefore an object of the present invention to provide a new and improved method of and apparatus for producing power wherein the disadvantages as outlined are reduced or substantially overcome.

SUMMARY OF THE INVENTION

A method for producing power, in accordance with the present invention, comprises the steps of: supplying clinker from cement production apparatus to a grate cooler for cooling the clinker; and extracting hot air from the grate cooler and supplying it to a filter e.g. an electrostatic precipitator or bag filter. When an electrostatic precipitator is used for extracting particulate matter from the hot air from the grate cooler, this hot air is supplied to the electrostatic precipitator. Thereafter, the filtered air exiting the electrostatic precipitator is supplied to an air-heat transfer fluid heat-exchanger containing e.g. thermal oil, etc., for heating the heat transfer fluid. A working fluid is vaporized using heat in the heated heat transfer fluid and vaporized working fluid and heat depleted heat transfer fluid are produced. Heat in the heat depleted heat transfer fluid is used to pre-heat working fluid, while the vaporized working fluid produced in the vaporizer is supplied to a turbine for producing power. Vaporized working fluid exiting the turbine is supplied to a working fluid condenser that condenses the vaporized working fluid exiting the turbine and produces working fluid condensate that is supplied to the vaporizer. Preferably, the method includes supplying the vaporized working fluid exiting the turbine to a recuperator that heats working fluid condensate supplied from the working fluid condenser prior to supplying said working fluid condensate to said vaporizer. Furthermore, preferably, the working fluid condensate is supplied to a pre-heater that preheats the working fluid condensate and produces preheated working fluid that is supplied to said vaporizer.

Moreover, the present invention includes apparatus for producing power comprising: a grate cooler for cooling clinker supplied from cement production apparatus; a filter e.g. an electrostatic precipitator or bag filter that extracts particulate matter from hot air supplied from said grate cooler; and an air-heat transfer fluid heat-exchanger containing e.g. thermal oil, etc., that heats said heat transfer fluid with heat from the filtered air exiting the electrostatic precipitator when such a precipitator is used. In addition, the apparatus includes a vaporizer that vaporizes working fluid using heat in the heated heat transfer fluid and produces vaporized working fluid and heat depleted heat transfer fluid. Furthermore, the apparatus includes a pre-heater that preheats working fluid using heat in said heat depleted heat transfer fluid and a turbine that receives vaporized working fluid produced in said vaporizer and produces power. The apparatus also provides a working fluid condenser that receives vaporized working fluid exiting the turbine and condenses the vaporized working fluid exiting the turbine, producing working fluid condensate that is supplied to said vaporizer. Preferably, the apparatus additionally includes a recuperator that heats working fluid condensate supplied from the working fluid condenser with heat from the vaporized working fluid exiting said turbine prior to supplying working fluid condensate to the vaporizer. Moreover, preferably, the apparatus includes a separate pre-heater that preheats the working fluid condensate and produces preheated working fluid that is supplied to the vaporizer. In the preferred embodiment of the present invention, the working fluid comprises an organic working fluid. Most preferably, the organic working fluid comprises pentane.

BRIEF DESCRIPTION OF THE DRAWINGS

Embodiments of the present invention are described by way of example, and with reference to the accompanying drawings wherein.

Like reference numerals and designations in the various drawings refer to like elements.

DETAILED DESCRIPTION

Figure 1:
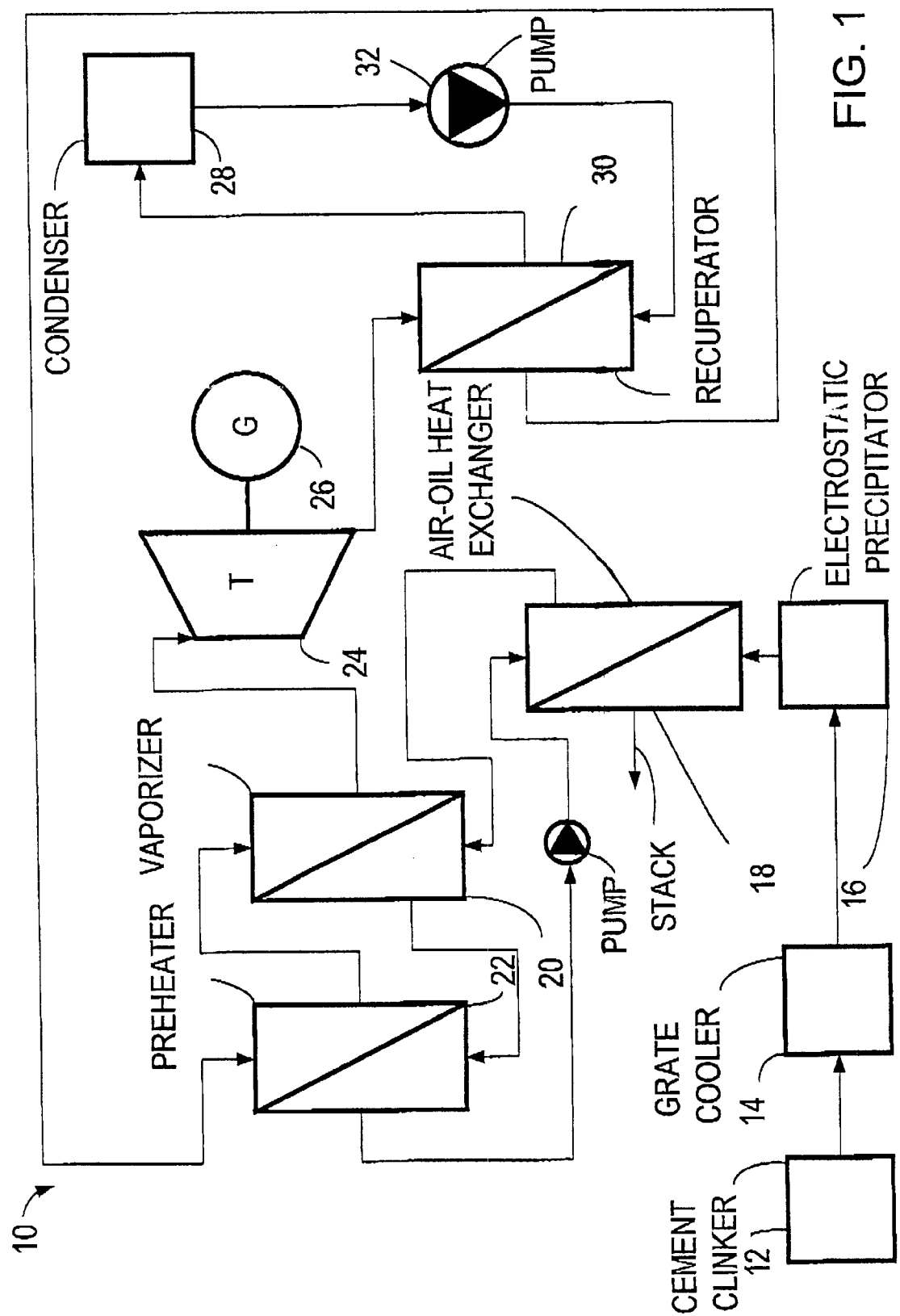
FIG. 1 is a block diagram of apparatus for producing power in accordance with one embodiment of the present invention.

Referring now to FIG. 1, reference numeral 10 designates an embodiment of apparatus for producing power in accordance with the present invention. Shown together with the apparatus to produce power is cement clinker 12 that is supplied to grate cooler 14 for cooling the clinker. Hot air from grate cooler 14 is supplied to electrostatic precipitator 16 for extracting particulate matter from the hot air. Filtered air exiting electrostatic precipitator 16 is supplied to air-heat transfer fluid heat-exchanger, e.g. air-oil heat exchanger, 18, containing thermal oil, etc., for transferring heat from the hot air to thermal oil contained therein. Heat depleted hot air is extracted from air-oil heat exchanger 18 while the heated thermal oil produced in heat exchanger 18 is preferably supplied to vaporizer 20 for vaporizing working fluid present therein. Heat depleted thermal oil exiting vaporizer 20 is supplied to pre-heater 22 for producing pre-heated working fluid. Further heat-depleted thermal oil exiting pre-heater 22 is supplied to air-oil heat exchanger 18 for heating. Vaporized working fluid is supplied from vaporizer 22 to turbine 24 for expansion and producing power so that electric generator 26 is preferably driven to produce electricity. Expanded vaporized working fluid exhausts from turbine 24 and is supplied to condenser 28 for producing working fluid condensate that is supplied to pre-heater 20 using pump 32. Preferably, however, before expanded working fluid is supplied to condenser 28, the expanded working fluid is first of all supplied to recuperator 30 for extracting heat from the expanded working fluid and the heat depleted expanded working fluid produced is supplied to condenser 28. The heat extracted from the expanded working fluid in recuperator 30 is extracted by working fluid condensate supplied from condenser 28 so that heated working fluid condensate is supplied to pre-heater 20.

When using an electrostatic precipitator such as electrostatic precipitator 16, temperatures of up to 400° C. may present in the electrostatic precipitator.

In an alternative, air-oil heat exchanger 18 can be positioned before electrostatic precipitator 16. Here, a particulate extractor placed before the air-oil heat exchanger 18 is used, such as a cyclone separator, etc., that extracts particulate matter before the hot gases exiting grate cooler 14 are supplied to air-oil heat exchanger 18. In this case, the size of electrostatic precipitator 16 that receives the heat depleted hot air from air-oil heat exchanger 18 can be reduced.

Figure 2:
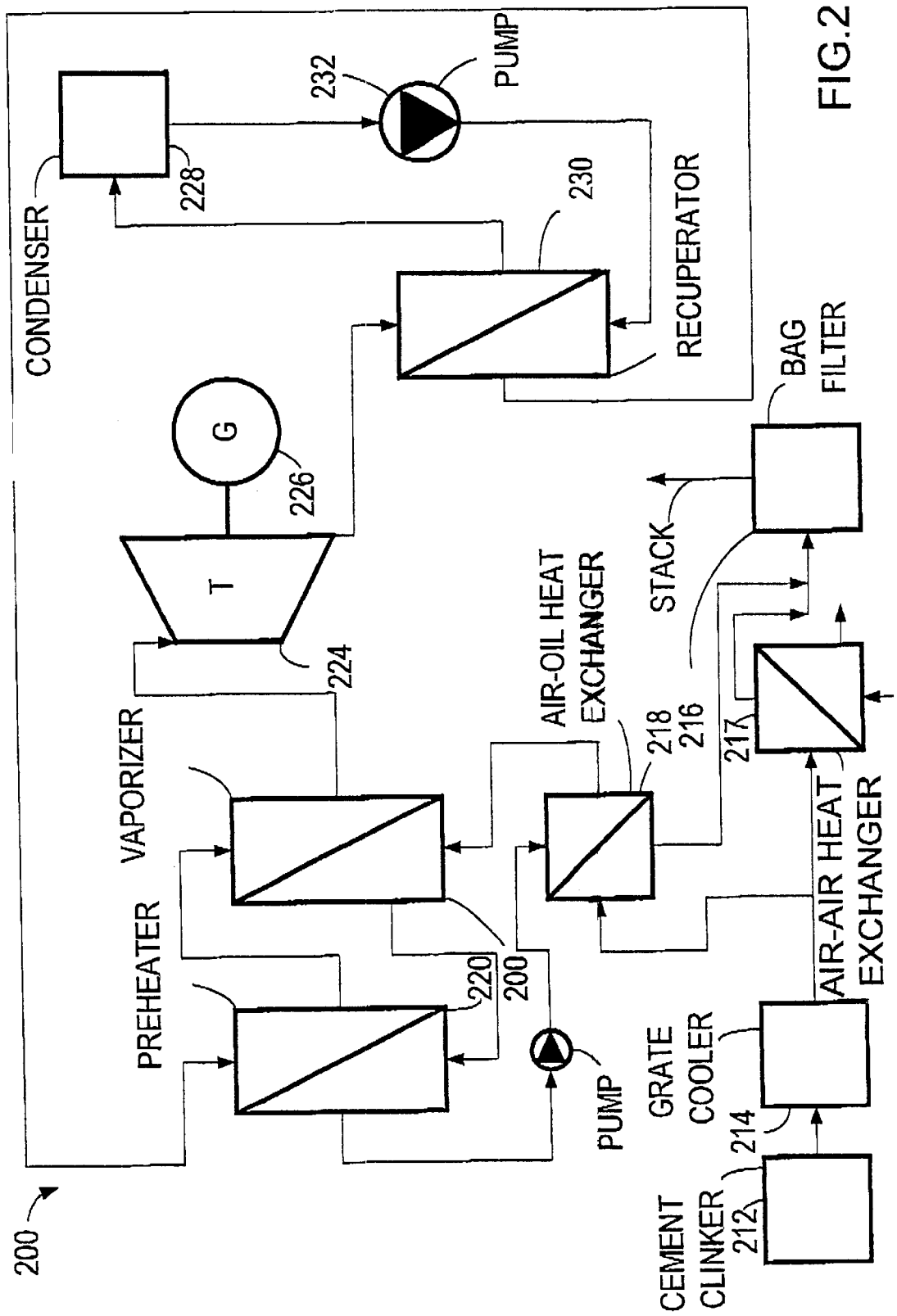
FIG. 2 is a block diagram of apparatus for producing power in accordance with another embodiment of the present invention.

Referring now to FIG. 2, reference numeral 200 designates a further embodiment of apparatus for producing power in accordance with the present invention. Shown together with the apparatus to produce power is cement clinker 212 that is supplied to grate cooler 214 for cooling the clinker. Hot air from grate cooler 214 is supplied to air-air heat exchanger 217 for transferring heat from hot air exiting grate cooler 214 to further air and producing heat depleted hot air which is supplied to bag filter 216. In this case, air-air heat exchanger 217 is used as a back-up system. Under usual operating conditions, hot air exiting grate cooler 214 is supplied to air-heat transfer fluid heat-exchanger, e.g. air-oil heat exchanger, 218, containing thermal oil, etc., for transferring heat from the hot air to thermal oil contained therein. A particulate extractor placed before the air-oil heat exchanger 218 such as a cyclone separator, etc., is used that extracts particulate matter before the hot gases exiting grate cooler 214 are supplied to air-oil heat exchanger 218. Further heat depleted hot air is extracted from air-oil heat exchanger 218 while the heated thermal oil produced in heat exchanger 218 is preferably supplied to vaporizer 220 for vaporizing working fluid present therein. The further heat depleted hot air exiting air-oil heat exchanger 218 is supplied directly to bag filter 216 for extracting particulate matter therefrom. Heat depleted thermal oil exiting vaporizer 220 is supplied to pre-heater 222 for producing pre-heated working fluid. Further heat-depleted thermal oil exiting pre-heater 222 is supplied to air-oil heat exchanger 218 for heating. Vaporized working fluid is supplied from vaporizer 222 to turbine 224 for expansion and producing power so that electric generator 226 is preferably driven to produce electricity. Expanded vaporized working fluid exhausts from turbine 224 and is supplied to condenser 228 for producing working fluid condensate that is supplied using pump 232 to pre-heater 220. Preferably, however, before expanded vaporized working fluid is supplied to condenser 228, the expanded vaporized working fluid is first of all supplied to recuperator 230 for extracting heat from the expanded vaporized working fluid and the heat depleted expanded working fluid produced is supplied to condenser 228. The heat extracted from the expanded vaporized working fluid in recuperator 230 is extracted by working fluid condensate supplied from condenser 228 so that heated working fluid condensate is supplied to pre-heater 220.

When using a bag filter such as bag filter 216, temperatures of 120° C. (up to 200° C.) may present in the bag filter.

Figure 2A:
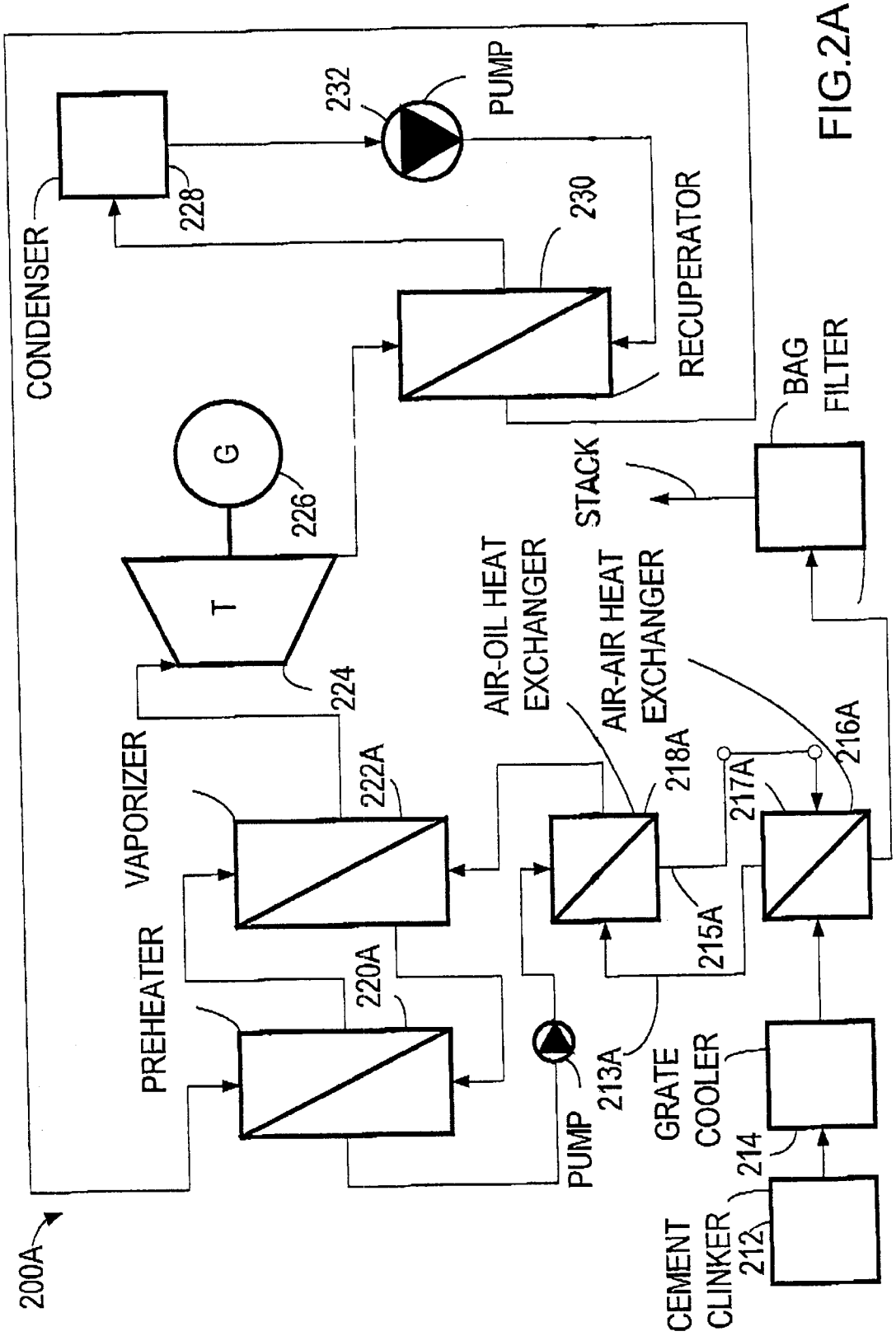
FIG. 2A is a block diagram of further apparatus for producing power in accordance with the present invention.

Turning to FIG. 2A, reference numeral 200A designates further apparatus for producing power in accordance with the present invention. Shown together with the apparatus to produce power is cement clinker 212 that is supplied to grate cooler 214 for cooling the clinker. Hot air from grate cooler 214 is supplied to air-air heat exchanger 217A for transferring heat from hot air exiting grate cooler 214 to further air and producing heat depleted hot air which is supplied to bag filter 216A. In the present embodiment, air-air heat exchanger 217A is used in the heat transfer system for producing power. Thus, under usual operating conditions, the further air used to cool the hot air exiting grate cooler 214 is supplied via line 213A to air-heat transfer fluid heat-exchanger, e.g. air-oil heat exchanger, 218A, containing thermal oil, etc., for transferring heat from the hot air to thermal oil contained therein. Heat depleted heated air is extracted from air-oil heat exchanger 218A via line 215A and supplied to air-air heat exchanger 217A while the heated thermal oil produced in heat exchanger 218A is preferably supplied to vaporizer 222A for vaporizing working fluid present therein. Heat depleted thermal oil exiting working vaporizer 222A is preferably supplied to pre-heater 220A for producing pre-heated working fluid. Further heat-depleted thermal oil exiting pre-heater 220A is supplied to air-oil heat exchanger 218A for heating. Vaporized working fluid is supplied from vaporizer 222A to turbine 224 for expansion and producing power so that electric generator 226 is preferably driven to produce electricity. Expanded vaporized working fluid exhausts from turbine 24 and is supplied to condenser 228 for producing working fluid condensate that is supplied using pump 232 to pre-heater 220A. Preferably, however, before expanded vaporized working fluid is supplied to condenser 228, the expanded vaporized working fluid is first of all supplied to recuperator 230 for extracting heat from the expanded vaporized working fluid and the heat depleted expanded working fluid produced is supplied to condenser 228. The heat extracted from the expanded vaporized working fluid in recuperator 230 is extracted by working fluid condensate supplied from condenser 228 so that heated working fluid condensate is supplied to pre-heater 220.

Figure 2B:
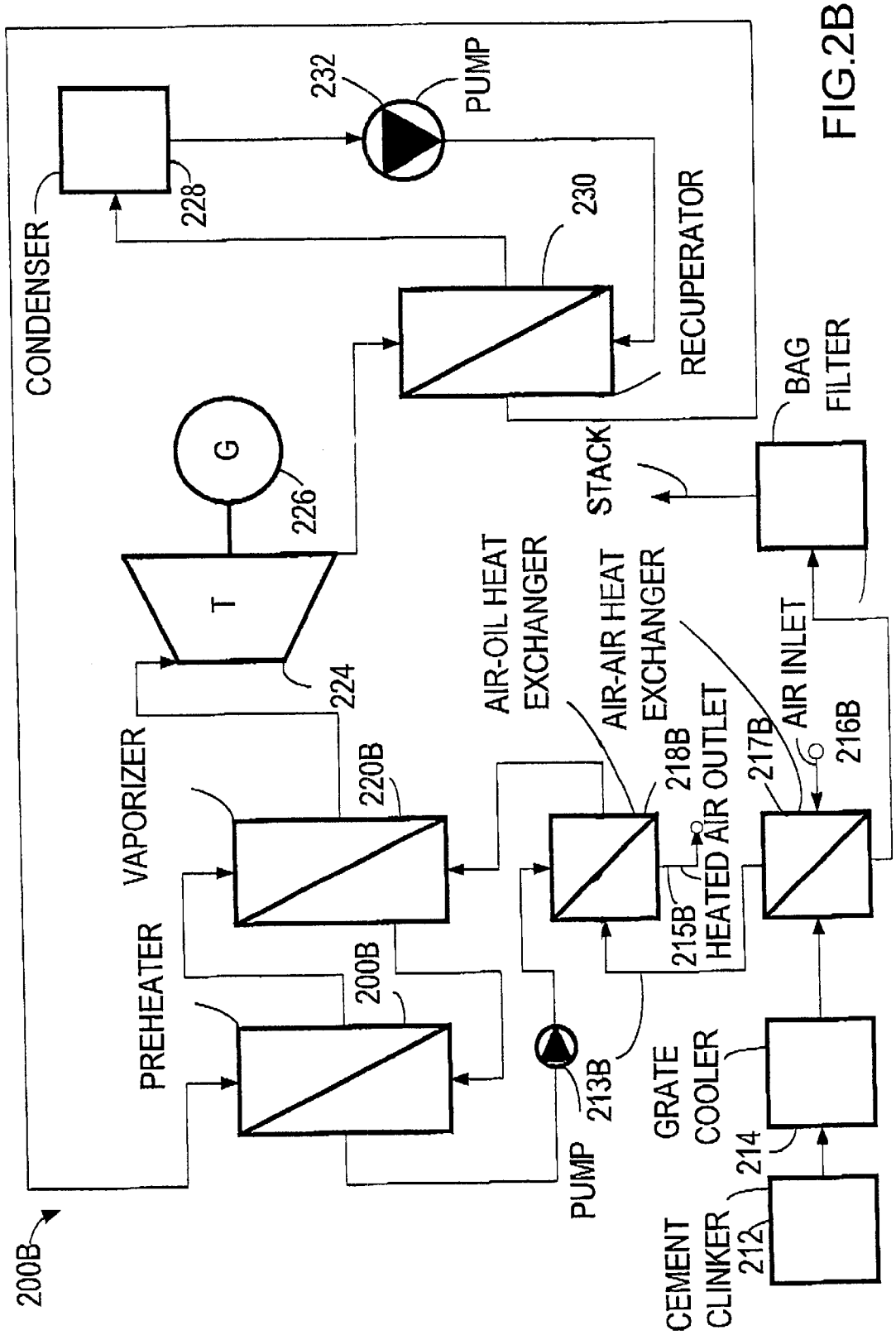
FIG. 2B is a block diagram of still further apparatus for producing power in accordance with the present invention.

In FIG. 2B, reference numeral 200B designates additional apparatus for producing power in accordance with the present invention. Shown together with the apparatus to produce power is cement clinker 212 that is supplied to grate cooler 214 for cooling the clinker. Hot air from grate cooler 214 is supplied to air-air heat exchanger 217B for transferring heat from hot air exiting grate cooler 214 to further air supplied by air inlet 211B to air-air heat exchanger 217B and producing heat depleted hot air which is supplied to bag filter 216B. In the present embodiment, air-air heat exchanger 217B is used in the heat transfer system for producing power. Thus, under usual operating conditions, the further air used to cool the hot air exiting grate cooler 214 is supplied via line 213B to air-heat transfer fluid heat-exchanger, e.g. air-oil heat exchanger, 218B, containing thermal oil, etc., for transferring heat from the hot air to thermal oil contained therein. Heat depleted heated air is extracted from air-oil heat exchanger 218B via line 215B and supplied to the ambient air via this hot air outlet while the heated thermal oil produced in heat exchanger 218B is preferably supplied to vaporizer 222B for vaporizing working fluid present therein. Heat depleted thermal oil exiting vaporizer 222B is preferably supplied to pre-heater 220B for producing pre-heated working fluid. Further heat-depleted thermal oil exiting pre-heater 20 is supplied to air-oil heat exchanger 218B for heating. Vaporized working fluid is supplied from vaporizer 222B to turbine 224 for expansion and producing power so that electric generator 226 is preferably driven to produce electricity. Expanded vaporized working fluid exhausts from turbine 224 and is supplied to condenser 228 for producing working fluid condensate that is supplied using pump 232 to pre-heater 220. Preferably, however, before expanded vaporized working fluid is supplied to condenser 228, the expanded vaporized working fluid is first of all supplied to recuperator 230 for extracting heat from the expanded vaporized working fluid and the heat depleted expanded working fluid produced is supplied to condenser 228. The heat extracted from the expanded vaporized working fluid in recuperator 230 is extracted by working fluid condensate supplied from condenser 228 so that heated working fluid condensate is supplied to pre-heater 220B.

Figure 2C:
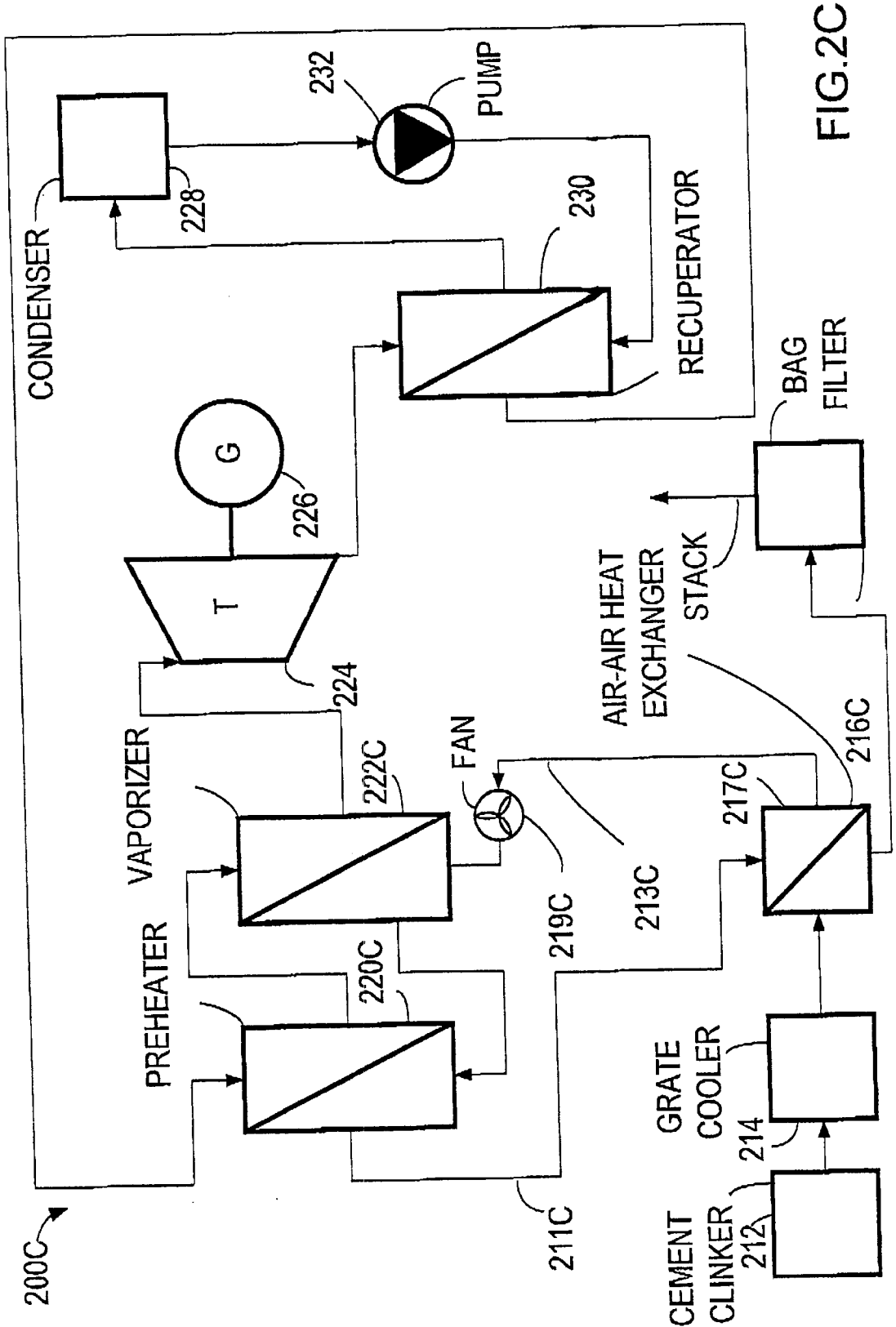
FIG. 2C is a block diagram of additional apparatus for producing power in accordance with the present invention.

Reference numeral 200C in FIG. 2C designates still additional apparatus for producing power in accordance with the present invention. Shown together with the apparatus to produce power is cement clinker 212 that is supplied to grate cooler 214 for cooling the clinker. Hot air from grate cooler 214 is supplied to air-air heat exchanger 217C for transferring heat from hot air exiting grate cooler 214 to further air supplied by line 211C to air-air heat exchanger 217C and producing heat depleted hot air which is supplied to bag filter 216C. In the present embodiment, air-air heat exchanger 217C is used in the heat transfer system for producing power. Thus, under usual operating conditions, the further air used to cool the hot air exiting grate cooler 214 is preferably supplied via line 213C and fan 219C to vaporizer 222C for vaporizing working fluid present therein without the use of an air-heat transfer fluid heat-exchanger containing e.g. thermal oil, etc. Heat depleted heated air exiting vaporizer 222C is preferably supplied to pre-heater 220C for producing pre-heated working fluid. Further heat-depleted heated air exiting pre-heater 220C is supplied to air-air heat exchanger 217C for heating. Vaporized working fluid is supplied from vaporizer 222C to turbine 224 for expansion and producing power so that electric generator 226 is preferably driven to produce electricity. Expanded vaporized working fluid exhausts from turbine 224 and is supplied to condenser 228 for producing working fluid condensate that is supplied using pump 232 to pre-heater 220C. Preferably, however, before expanded vaporized working fluid is supplied to condenser 228, the expanded vaporized working fluid is first of all supplied to recuperator 230 for extracting heat from the expanded vaporized working fluid and the heat depleted expanded working fluid produced is supplied to condenser 228. The heat extracted from the expanded vaporized working fluid in recuperator 230 is extracted by working fluid condensate supplied from condenser 228 so that heated working fluid condensate is supplied to pre-heater 220C.

Figure 2D:
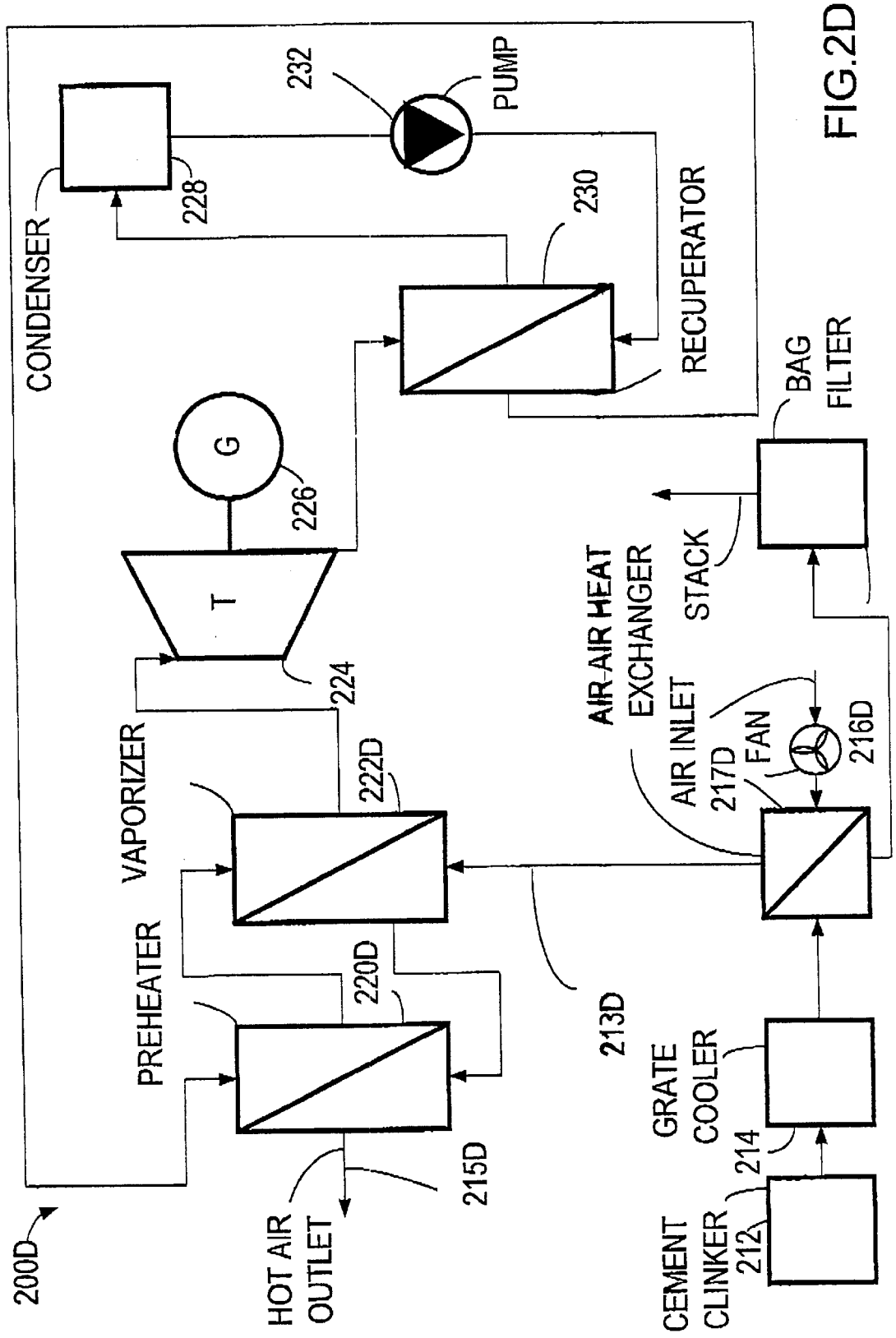
FIG. 2D is a block diagram of still additional apparatus for producing power in accordance with the present invention.

Turning now to FIG. 2D, numeral 200D designates still further apparatus for producing power in accordance with the present invention. Shown together with the apparatus to produce power is cement clinker 212 that is supplied to grate cooler 214 for cooling the clinker. Hot air from grate cooler 214 is supplied to air-air heat exchanger 217D for transferring heat from hot air exiting grate cooler 214 to further air supplied by line 211D and fan 219D to air-air heat exchanger 217D and producing heat depleted hot air which is supplied to bag filter 216D. In the present embodiment, air-air heat exchanger 217D is used in the heat transfer system for producing power. Thus, under usual operating conditions, the further air used to cool the hot air exiting grate cooler 214 is preferably supplied via line 213D to vaporizer 222D for vaporizing working fluid present therein without the use of an air-heat transfer fluid heat-exchanger containing e.g. thermal oil, etc. Heat depleted heated air exiting vaporizer 222D is preferably supplied to pre-heater 220D for producing pre-heated working fluid. Further heat-depleted heated air exiting pre-heater 220D is supplied via line 215D to the ambient air. Vaporized working fluid is supplied from vaporizer 222D to turbine 224 for expansion and producing power so that electric generator 226 is preferably driven to produce electricity. Expanded vaporized working fluid exhausts from turbine 224 and is supplied to condenser 228 for producing working fluid condensate that is supplied using pump 232 to pre-heater 220D. Preferably, however, before expanded vaporized working fluid is supplied to condenser 228, the expanded vaporized working fluid is first of all supplied to recuperator 230 for extracting heat from the expanded vaporized working fluid and the heat depleted expanded working fluid produced is supplied to condenser 228. The heat expanded from the expanded vaporized working fluid in recuperator 230 is extracted by working fluid condensate supplied from condenser 228 so that heated working fluid condensate is supplied to pre-heater 220D.

Figure 3:
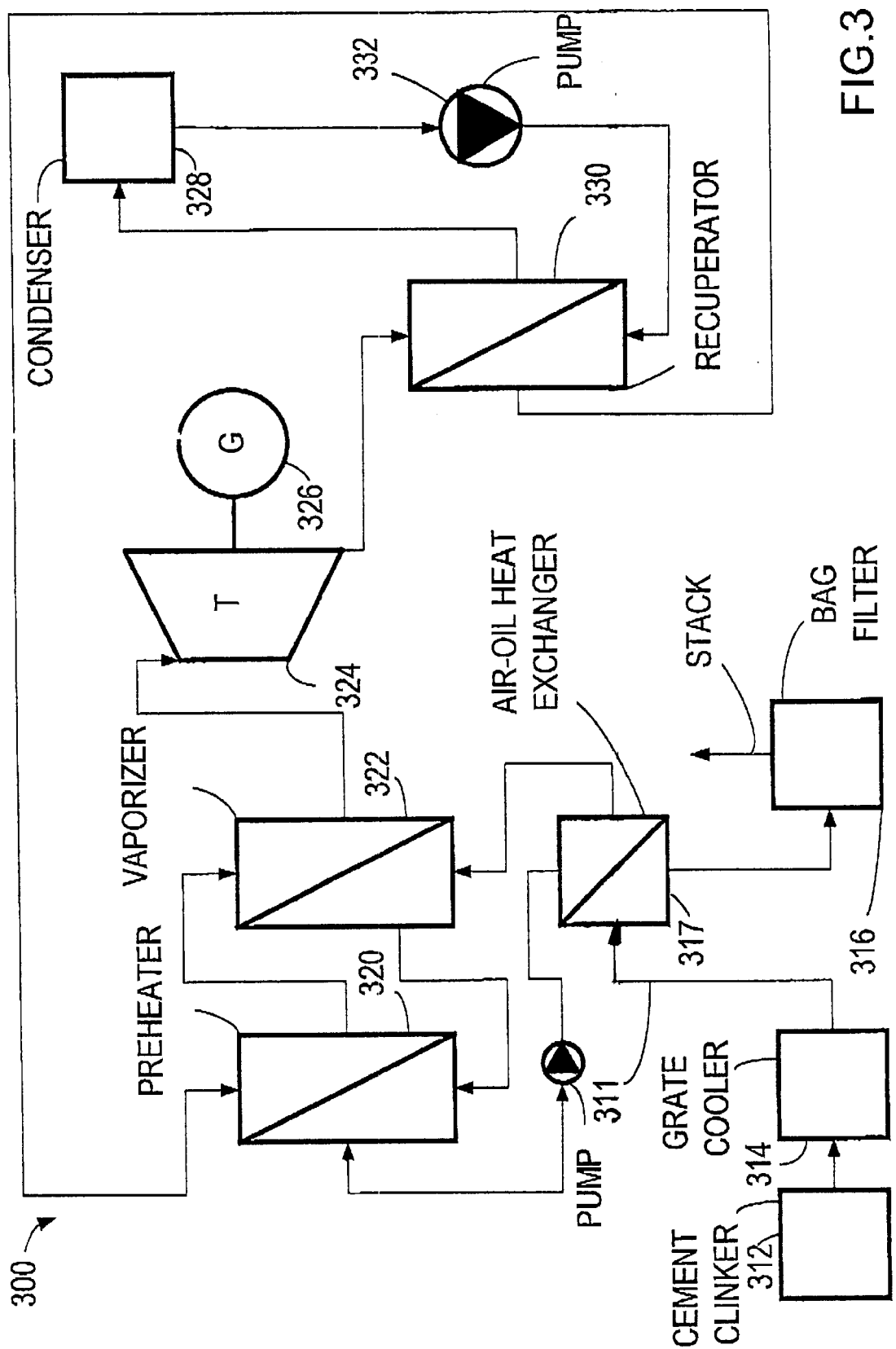
FIG. 3 is a block diagram of even further apparatus for producing power in accordance with the present invention.

Another apparatus for producing power in accordance with the present invention designated 300 is described with reference to FIG. 3. Shown together with the apparatus to produce power is cement clinker 312 that is supplied to grate cooler 314 for cooling the clinker. Hot air from grate cooler 314 is supplied to air-heat transfer fluid heat-exchanger, e.g. air-oil heat exchanger, 317, containing thermal oil, etc., for transferring heat from the hot air exiting grate cooler 314 to thermal oil contained therein and producing heat depleted hot air which is supplied to bag filter 316. Preferably, a particulate extractor placed before the air-oil heat exchanger 317 such as a cyclone separator, etc., is used that extracts particulate matter before the hot gases exiting grate cooler 314 are supplied to air-oil heat exchanger 317. Thus, under usual operating conditions, the heated thermal oil produced in heat exchanger 317 is preferably merely supplied to vaporizer 322 for vaporizing working fluid present therein. Heat depleted thermal oil exiting vaporizer 322 is preferably supplied to pre-heater 320 for producing pre-heated working fluid. Further heat-depleted thermal oil exiting pre-heater 320 is supplied to air-oil heat exchanger 317 for heating. Vaporized working fluid is supplied from vaporizer 322 to turbine 324 for expansion and producing power so that electric generator 326 is preferably driven to produce electricity. Expanded vaporizes working fluid exhausts from turbine 324 and is supplied to condenser 328 for producing working fluid condensate that is supplied using pump 332 to pre-heater 320. Preferably, however, before expanded vaporized working fluid is supplied to condenser 328, the expanded vaporized working fluid is first of all supplied to recuperator 330 for extracting heat from the expanded vaporized working fluid and the heat depleted expanded working fluid produced is supplied to condenser 328. The heat extracted from the expanded vaporized working fluid in recuperator 330 is extracted by working fluid condensate supplied from condenser 328 so that heated working fluid condensate is supplied to pre-heater 320.

Figure 3A:
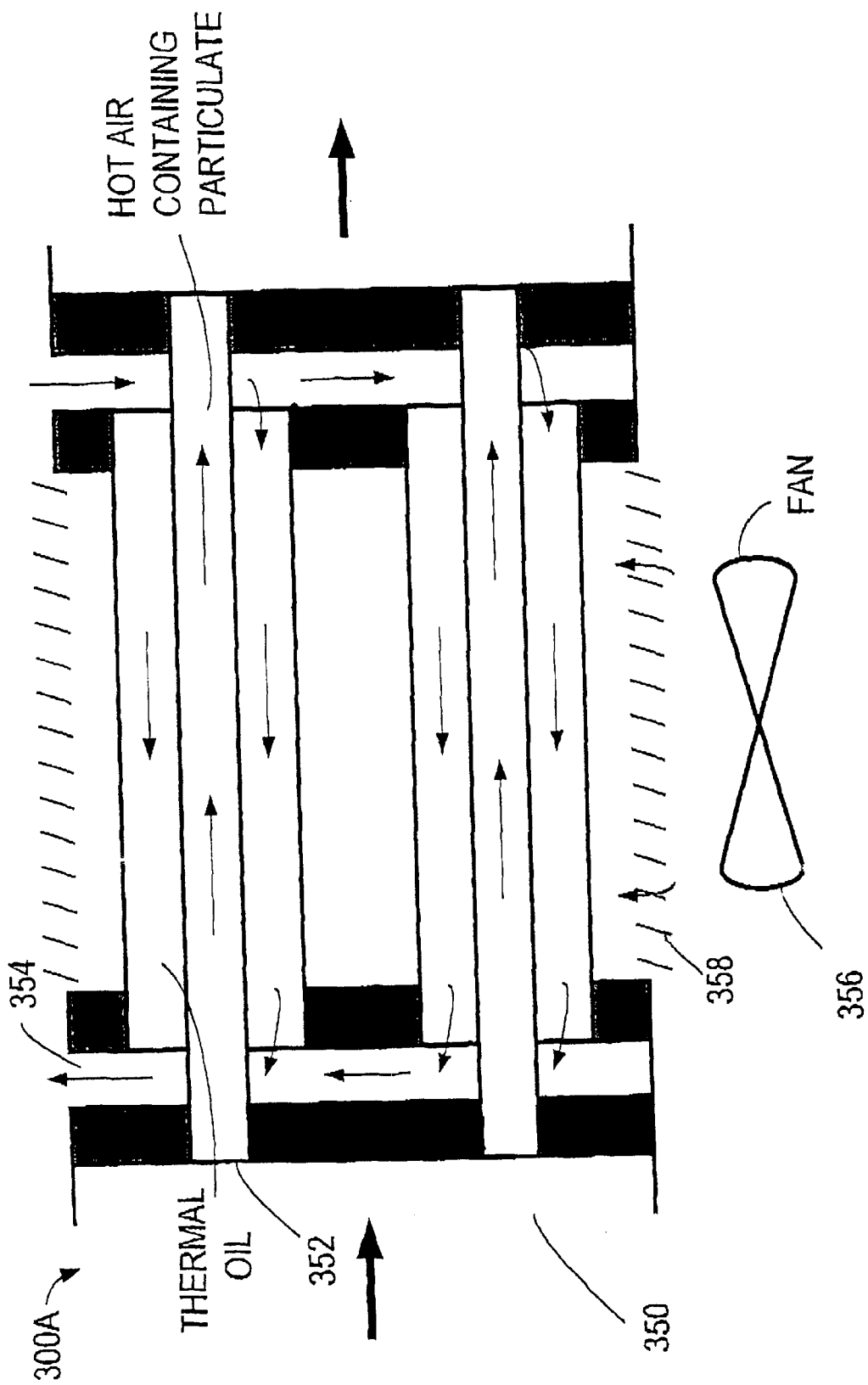
FIG. 3A is a block diagram of a heat exchanger for use in conjunction with the apparatus described with reference to FIG. 3.

In this embodiment, air-oil heat exchanger, 317, can preferably take the form of a counter-flow heat exchanger described with reference to FIG. 3A designated therein 300A. As shown in FIG. 3A, heat exchanger 300A can take the form of a shell and tube heat exchanger wherein hot air exiting grate cooler 314 and entering the heat exchanger via line 311 (see FIG. 3, the heat exchanger designated 317 in FIG. 3) flows through shell 350 and passages 352. On the other hand, the thermal oil flows in tubes 354 of shell and tube heat exchanger 300A preferably in a direction counter to the direction of flow of the hot air flowing in passages 352. In such a manner, the heat transfer is improved. In addition, fan 356 and louvers 358 are provided for supplying air to the heat exchanger for cooling the tubes if for some reason the flow of thermal oil is stopped.

Figure 3B:
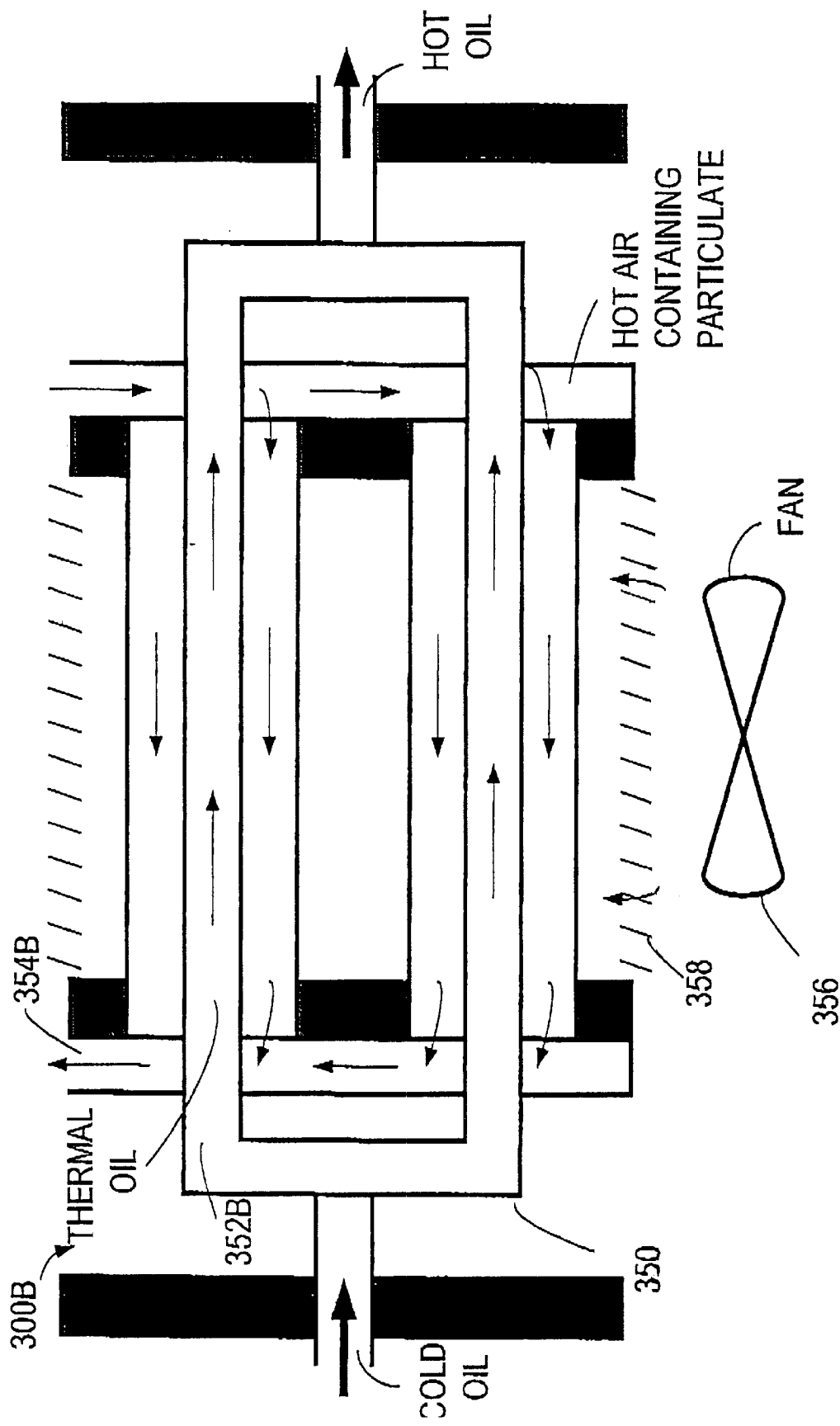
FIG. 3B is a block diagram of another heat exchanger for use in conjunction with the apparatus described with reference to FIG. 3.

Another form of a counter-flow heat exchanger is shown in FIG. 3B designated 300B. In this heat exchanger, the thermal oil flows in the internal envelope 352B while the hot air containing particulate flows in the external envelope 354B. In such a manner, the hot air can be cooled more effectively by the air supplied by fan 356 via louvers 358 when the thermal oil is not following.

Preferably, the working fluid in all embodiments comprises an organic working fluid. Most preferably, the organic working fluid comprises pentane, either n-pentane or iso-pentane.

While the present specification refers specifically to thermal oil as the heat transfer fluid used in the air-heat transfer fluid heat exchanger, the present invention can use pressurized water in a pressurized water loop rather than the thermal oil. Alternatively, steam, etc. can be used instead of the thermal oil.

Furthermore, it is to be pointed out that the embodiments described with reference to FIGS. 2A and 2B can be combined. In such a case, diverters can be installed in line 215A of FIG. 2A at the two locations indicated by the circles present in this line so that the diverter at the lower location on the figure can permit this point to operate as an air inlet while the diverter positioned at the upper location on the figure can permit this point to operate as an air outlet. Alternatively, a line can be added between the heated air outlet at the exit of line 215B and the air inlet to air-air heat exchanger 217B appearing in FIG. 2B, indicated by circles, so that this embodiment can operate in the same manner as the embodiment described with reference to FIG. 2A.

Additionally, while the present invention as described refers to the production of power from heat used to cool a grate cooler of cement clinker, the present invention can also be used for utilizing heat present in the production or processing of glass.

In addition, it should be noted that supply means or lines mentioned in this specification refer to suitable conduits, etc.

Furthermore, it should be pointed out that the present invention includes as well the method for operating the apparatus disclosed with reference to the above-described figures.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. A method for producing power comprising the steps of:
   a) supplying clinker from cement production apparatus to a grate cooler for cooling the clinker;
   b) extracting hot air from the grate cooler and supplying it to a electrostatic precipitator for extracting particulate matter from said hot air;
   c) supplying filtered air exiting said electrostatic precipitator to an air-heat transfer fluid heat-exchanger for heating a heat transfer fluid;
   d) vaporizing working fluid in a vaporizer using heat in the heated heat transfer fluid and producing vaporized working fluid and heat depleted heat transfer fluid;
   e) pre-heating working fluid using heat in said heat depleted heat transfer fluid;
   f) supplying vaporized working fluid produced in said vaporizer to a turbine for producing power;
   g) supplying vaporized working fluid exiting said turbine to a working fluid condenser that condenses said vaporized working fluid exiting said turbine and producing working fluid condensate; and
   h) supplying said working fluid condensate to said vaporizer.

2. A method according to claim 1 indicating supplying the vaporized working fluid exiting said turbine to a recuperator that heat working fluid condensate supplied from said working fluid condenser prior to supplying said working fluid condensate to said vaporizer.

3. A method according to claim 1 wherein said working fluid condensate is supplied to a pre-heater that preheats said working fluid condensate and produces preheated working fluid that is supplied to said vaporizer.

4. Apparatus for producing power comprising:
   a) a grate cooler for cooling clinker supplied from cement production apparatus;
   b) a electrostatic precipitator that extracts particulate matter from hot air supplied from said grate cooler;
   c) an air-heat transfer fluid heat-exchanger that heats heat transfer fluid with heat from filtered air exiting said electrostatic precipitator;
   d) a vaporizer that vaporizes working fluid using heat in the heated heat transfer fluid and produces vaporized working fluid and heat depleted heat transfer fluid;
   e) a pre-heater that vaporizes pre-heated working fluid in a pre-heater using heat in said heat depleted heat transfer fluid;
   f) a turbine that receives vaporized working fluid produced in said vaporizer and produces power; and
   g) a working fluid condenser that receives vaporized working fluid exiting said turbine and condenses said vaporized working fluid exiting said turbine, producing working fluid condensate that is supplied to said vaporizer.

5. Apparatus according to claim 4 including a recuperator that heats working fluid condensate supplied from said working fluid condenser with heat from the vaporized working fluid exiting said turbine prior to supplying working fluid condensate to said vaporizer.

6. Apparatus according to claim 4 wherein said pre-heater preheats said working fluid condensate and produces preheated working fluid that is supplied to said vaporizer.

7. Apparatus according to claim 4 wherein said working fluid comprises an organic working fluid.

8. Apparatus according to claim 7 wherein said working fluid comprises pentane.

9. A method for producing power comprising the steps of:
a) supplying clinker from cement production apparatus to a grate cooler for cooler for cooling the clinker;
b) extracting hot air from the grate cooler and supplying it to a bag filter for extracting particulate matter from said hot air;
c) supplying air exiting said grate cooler to an air-heat transfer fluid heat-exchanger for heating a heat transfer fluid and cooling said air prior to supplying said air exiting said grate cooler to said bag filter;
d) vaporizing working fluid in a vaporizer using heat in the heated heat transfer fluid and producing vaporized working fluid and heat depleted heat transfer fluid;
e) pre-heating said working fluid using heat in said heat depleted heat transfer fluid;
f) supplying said vaporized working fluid produced in said vaporizer to a turbine for producing power;
g) supplying said vaporized working fluid exiting said turbine to a working fluid condenser that condenses said vaporized working fluid exiting said turbine and producing working fluid condensate; and
h) supplying said working fluid condensate to said vaporizer.

10. The method according to claim 9 including the step of filtering the air prior to supplying it to said air-heat transfer fluid heat exchanger.

11. The method according to claim 9 including supplying the vaporized working fluid exiting said turbine to a recuperator that heats the working fluid condensate supplied from said working fluid condenser prior to supplying said working fluid condensate to said vaporizer.

12. The method according to claim 9 wherein said working fluid condensate is supplied to a pre-heater that preheats said working fluid condensate and produces preheated working fluid that is supplied to said vaporizer.

13. Apparatus for producing power comprising:
a) a grate cooler for cooling clinker supplied from cement production apparatus;
b) a bag filter that extracts particulate matter from hot air supplied from said grate cooler;
c) an air-heat transfer fluid heat exchanger that heats heat transfer fluid with heat from air exiting said grate cooler and cools said air prior to supplying it to said bag filter;
d) a vaporizer that vaporizes working fluid using heat in the heated heat transfer fluid and produces vaporized working fluid and heat depleted heat transfer fluid;
e) a pre-heater that vaporizes pre-heated working fluid using heat in said heat depleted heat transfer fluid;
f) a turbine that receives said vaporized working fluid produced in said vaporizer and produces power; and
g) a working fluid condenser that receives said vaporized working fluid exiting said turbine and condenses said vaporized working fluid exiting said turbine, producing working fluid condensate that is supplied to said vaporizer.

14. The apparatus according to claim 13 including a recuperator that heats said working fluid condensate supplied from said working fluid condenser with heat from the vaporized working fluid exiting said turbine prior to supplying said working fluid condensate to said vaporizer.

15. The apparatus according to claim 13 wherein said pre-heater preheats said working fluid condensate and produces preheated working fluid that is supplied to said vaporizer.

16. The apparatus according to claim 13 wherein said working fluid comprises an organic working fluid.

17. The apparatus according to claim 16 wherein said organic working fluid comprises pentane.

18. Apparatus according to claim 13 wherein said air-heat transfer fluid heat exchanger comprises a counter-flow heat exchanger.

19. Apparatus according to claim 18 wherein said counter-flow heat exchanger comprises a shell and tube heat exchanger.

* * * * *